(No Model.)
M. S. DICKINSON.
DRIVING REIN.
No. 422,124. Patented Feb. 25, 1890.
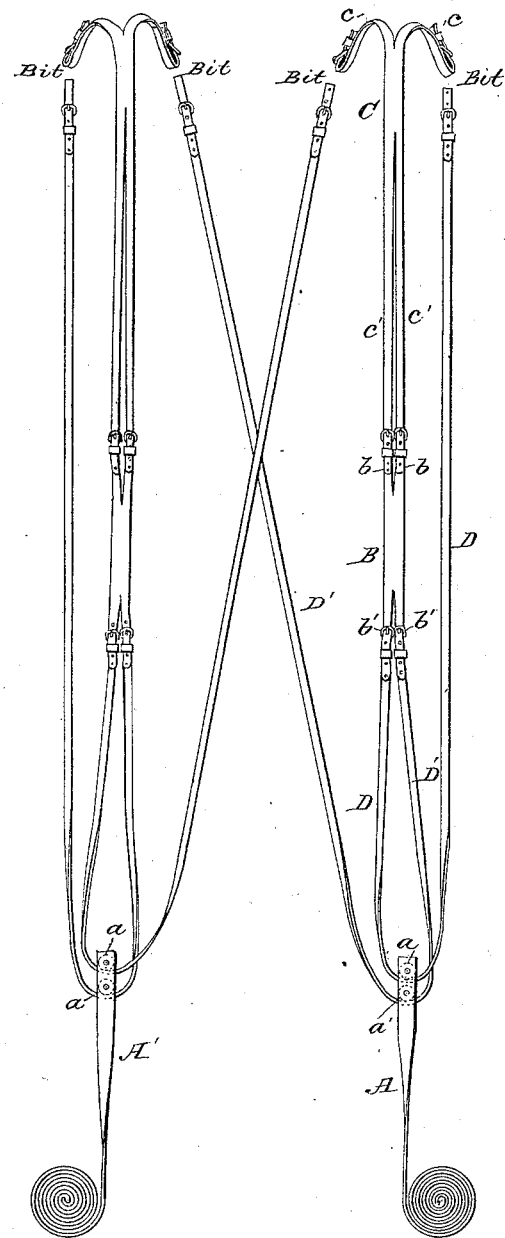
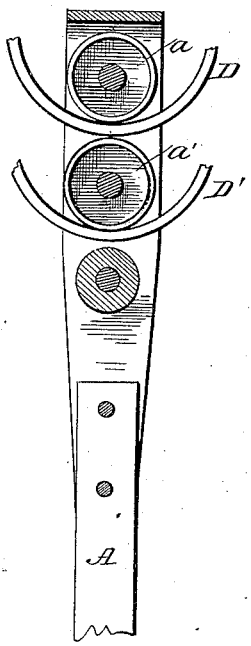
WITNESSES
Fred G. Dieterich
Edw. W. Byrn.
INVENTOR
M. S. Dickinson
BY Munn
ATTORNEY

UNITED STATES PATENT OFFICE.

MATTHEW SMITH DICKINSON, OF LOS ANGELES, CALIFORNIA.

DRIVING-REIN.

SPECIFICATION forming part of Letters Patent No. 422,124, dated February 25, 1890.

Application filed August 1, 1889. Serial No. 319,378. (No model.)

*To all whom it may concern:*

Be it known that I, MATTHEW SMITH DICKINSON, of Los Angeles, in the county of Los Angeles and State of California, have invented a new and useful Improvement in Driving-Reins, of which the following is a specification.

The object of my invention is to provide an improvement in driving-reins for a double team which will dispense with the ordinary checkreins, and which, while causing the horses to carry high heads, will also allow perfect freedom to the animals to stretch out their necks and lower their heads when tension on the reins is slackened, and will allow the animals to work their heads or change the angle of the same even when the reins are under tension.

My invention is an improvement upon the driving-reins patented by me November 13, 1888, No. 392,789; and it consists in the peculiar construction and arrangement of the parts which I will now proceed to fully describe.

Figure 1 is a perspective view of the reins, looking down upon the same; and Fig. 2 is a sectional detail of the front end of one of the main sections of the driving-reins.

In the drawings, A A' represent the two main sections of the driving-reins, which terminate just in rear of the saddle and have at their front ends loops containing two pulleys or rollers $a\ a'$ for each rein. Each horse is equipped alike with an overdraw-check consisting of a middle section B, having two front ends $b\ b$ and two rear ends $b'\ b'$, and a front portion C, having two rear ends $c'\ c'$ and two front ends $c\ c$. This front portion extends over the horse's head, and its front ends are connected, respectively, to the two sides of the bit, while the rear ends $c'\ c'$ are connected by buckles or otherwise to the front ends of the middle part of the overdraw-check. The rear ends $b'\ b'$ of the middle portion are respectively buckled or otherwise fastened to the short-rein sections D D'. One of these reins D passes behind one of the rollers $a$, and then extends forward to the right-hand ring or check-piece of the bit of one horse, and the other short-rein section D' extends behind the other roller $a'$ of the same main rein A, and then passes forward to the right-hand ring or check-piece of the bit of the other horse. Both horses being equipped exactly alike, it will be seen that a pull upon the main-rein section A is transmitted in part to the right-hand sides of the bits of both horses and in part to the overdraw of the right-hand horse of the team through the short-rein sections D D', which freely slip over the rollers and give a uniform tension to both horses of the team. A pull upon the other main rein is transmitted in part to the left-hand sides of the bits of both horses and in part to the overdraw of the left-hand horse of the team, and when both main reins A and A' are equally pulled upon the pull is distributed to both sides of the bits of both horses, and also upon the overdraw of both horses, which causes the team to hold their heads high. Upon the slackening of the main reins the tension is relieved upon the overdraw, and the horses can lower their heads to drink water or pull up a hill. With this construction of parts it will be seen that the horse's head is free, so that the animal can rock or bow his head, the short reins D D' passing back and forth around the rollers or pulleys in this movement.

In making use of my invention the arrangement of the pulleys may be varied by placing the rollers to one side of each other, instead of one in front of the other, as shown, or the rollers $a\ a'$ may be carried in separate frames attached to the main-rein section.

Having thus described my invention, what I claim as new is—

1. The driving-reins herein described, consisting of the main sections A A', having rollers or pulleys $a$ and $a'$, the overdraw-checkreins, and the two pairs of short-rein sections, each pair having their ends connected, respectively, to the two rear ends of the same overdraw, and then passing around the pulleys or rollers and extending, respectively, to the same side of the two bits of the team, substantially as shown and described.

2. The driving-reins herein described, consisting of the main sections A A', having rollers or pulleys $a$ and $a'$, the overdraw-checkreins consisting of middle portion B, with front ends $b$ $b$ and rear ends $b'$ $b'$, the front portion C, with rear ends $c'$ $c'$ and front ends $c$ $c$, and the short-rein sections D D', arranged for each horse, with one set of ends connecting with the rear ends of each overdraw and their other ends passed around the pulleys or rollers $a$ $a'$ and extending to the same side of the two bits, substantially as shown and described.

MATTHEW SMITH DICKINSON.

Witnesses:
A. C. HOLMES,
S. P. MULFORD.